(12) United States Patent
Jiang et al.

(10) Patent No.: US 8,906,191 B2
(45) Date of Patent: Dec. 9, 2014

(54) METHOD FOR MAKING PROTECTIVE DEVICE FOR PROTECTING CARBON NANOTUBE FILM

(75) Inventors: Kai-Li Jiang, Beijing (CN); Liang Liu, Beijing (CN); Shou-Shan Fan, Beijing (CN)

(73) Assignees: Tsinghua University, Beijing (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/542,935

(22) Filed: Jul. 6, 2012

(65) Prior Publication Data

US 2012/0273118 A1 Nov. 1, 2012

Related U.S. Application Data

(62) Division of application No. 12/653,243, filed on Dec. 10, 2009, now Pat. No. 8,247,055.

(30) Foreign Application Priority Data

Jun. 9, 2009 (CN) .......................... 2009 1 0108048

(51) Int. Cl.
*B29C 65/18* (2006.01)
*B29C 65/76* (2006.01)
(Continued)

(52) U.S. Cl.
CPC ............. *C01B 31/0206* (2013.01); *B29C 65/18* (2013.01); *B29C 65/76* (2013.01); *B29C 70/14* (2013.01); *B32B 5/26* (2013.01); *B32B 7/06* (2013.01); *B32B 9/04* (2013.01); *B32B 37/20* (2013.01); *B82Y 30/00* (2013.01); *B82Y 40/00* (2013.01); *C09J 7/0225* (2013.01); *B32B 2262/106* (2013.01); *C01B 2202/08* (2013.01); *B32B 2313/04* (2013.01); *C09J 2427/005* (2013.01); *C09J 2483/005* (2013.01); *C09J 2491/005* (2013.01)
USPC .......................... 156/289; 156/306.3; 156/324

(58) Field of Classification Search
CPC ........ B29C 65/02; B29C 65/18; B29C 65/20; B29C 65/76; B29C 70/14; B32B 5/02; B32B 5/022; B32B 5/26; B32B 7/06; B32B 9/047; B32B 2262/106; B32B 2307/202; B32B 2313/04; B32B 2457/00; B82Y 30/00; B82Y 40/00; C01B 2202/28
USPC .................... 156/247, 289, 306.3, 308.2, 324
See application file for complete search history.

(56) References Cited

U.S. PATENT DOCUMENTS 2,983,306 A * 5/1961 Resnick ..................... 156/379.7
3,784,433 A * 1/1974 Garnish et al. ................ 156/276
(Continued)

FOREIGN PATENT DOCUMENTS

JP 2005-1942 1/2005
JP 2005-7861 1/2005
(Continued)

*Primary Examiner* — Michael Tolin
(74) *Attorney, Agent, or Firm* — Novak Druce Connolly Bove + Quigg LLP

(57) ABSTRACT

A method for making a protective device for protecting at least one carbon nanotube film is disclosed. At least one carbon nanotube film is pulled or drawn out from at least one carbon nanotube array. The carbon nanotube film has a first end connected to the carbon nanotube array and a second end opposite to the first end. A portion of the carbon nanotube film from the second end and a portion of a protecting film from one end are stacked on a portion of a base film along a length direction of the base film. Two rollers and a first spool are rotated so that the base film, the carbon nanotube film, and the protecting film pass through the two rollers while being pressed by the two rollers and rolled onto the first spool.

6 Claims, 8 Drawing Sheets

(51) Int. Cl.
*B29C 70/14* (2006.01)
*B32B 7/06* (2006.01)
*C01B 31/02* (2006.01)
*B32B 5/26* (2006.01)
*B32B 9/04* (2006.01)
*B32B 37/20* (2006.01)
*B82Y 30/00* (2011.01)
*B82Y 40/00* (2011.01)
*C09J 7/02* (2006.01)

(56) References Cited

U.S. PATENT DOCUMENTS

| | | | | |
|---|---|---|---|---|
| 4,372,800 | A | * | 2/1983 | Oizumi et al. ............ 156/307.3 |
| 4,495,017 | A | * | 1/1985 | Abe et al. ...................... 156/181 |
| 7,850,778 | B2 | * | 12/2010 | Lemaire ...................... 118/715 |
| 2006/0113510 | A1 | | 6/2006 | Luo et al. |
| 2006/0188721 | A1 | | 8/2006 | Irvin, Jr. et al. |
| 2008/0245548 | A1 | | 10/2008 | Fu et al. |
| 2008/0248235 | A1 | * | 10/2008 | Feng et al. .................... 428/113 |
| 2008/0308209 | A1 | | 12/2008 | Loutfy et al. |
| 2008/0317982 | A1 | | 12/2008 | Hecht et al. |
| 2009/0111343 | A1 | * | 4/2009 | Takahashi et al. ............... 442/65 |
| 2009/0280324 | A1 | * | 11/2009 | Liang et al. .................... 428/367 |
| 2011/0059317 | A1 | | 3/2011 | Elhard et al. |

FOREIGN PATENT DOCUMENTS

| | | |
|---|---|---|
| JP | 2008-535752 | 9/2008 |
| JP | 2008-536710 | 9/2008 |
| TW | 200842175 | 11/2008 |
| WO | WO2009052110 | 4/2009 |

* cited by examiner

METHOD FOR MAKING PROTECTIVE DEVICE FOR PROTECTING CARBON NANOTUBE FILM

CROSS-REFERENCE TO RELATED APPLICATIONS

This application claims all benefits accruing under 35 U.S.C. §119 from China Patent Application No. 200910108048.3, filed on Jun. 9, 2009 in the China Intellectual Property Office. This application is a divisional of U.S. patent application Ser. No. 12/653,243, filed on Dec. 10, 2009, entitled, "PROTECTIVE DEVICE FOR PROTECTING CARBON NANOTUBE FILM", now U.S. Pat. No. 8,247,055.

BACKGROUND

1. Technical Field

The present disclosure relates to protective structures and methods for making the same, particularly, to a protective structure for protecting carbon nanotube film and a method for making the same.

2. Description of Related Art

Carbon nanotubes are tubules of carbon generally having a diameter of 0.5 nanometers to 100 nanometers, and composed of a number of coaxial cylinders of graphite sheets. Carbon nanotubes have interesting and potentially useful thermal, electrical and mechanical properties, and have recently attracted a great deal of attention for use in different applications such as field emitters, gas storage and separation, chemical sensors, and high strength composites.

However, the main deterrent to the application of carbon nanotubes is the difficulty to process, due to the powder form of the carbon nanotube products. Therefore, forming the separate and tiny carbon nanotubes into a manipulable carbon nanotube structure, such as a film, is a significant step in the utilization of carbon nanotubes.

Recently, as disclosed by patent application US20080248235 to Feng et al., a free-standing carbon nanotube film has been fabricated. The carbon nanotube film is directly drawn from a carbon nanotube array. The carbon nanotube film includes a plurality of carbon nanotubes joined end-to-end by van der Waals attractive force therebetween. The carbon nanotubes are substantially parallel to a surface of the carbon nanotube film, and thus, the carbon nanotube film has a good transparency. The carbon nanotubes in the carbon nanotube film are substantially aligned along the same direction, and thus, the carbon nanotube film has good properties, such as thermal and electrical conductivities, along the direction of the aligned carbon nanotubes. Further, the carbon nanotube film is free standing and adhesive, and can be laid and attached on any desired place. Furthermore, the carbon nanotube film is flexible. Therefore, the carbon nanotube film can be used in many different fields. For example, the carbon nanotube film can be used as a transparent conductive film in a touch panel or a liquid display, which can be flexible.

However, this kind of carbon nanotube film is very thin. In the carbon nanotube film, the adjacent carbon nanotubes are only combined and attracted by the van der Waals attractive force therebetween, and thus the force is relatively week. An external mechanical force applied on the carbon nanotube film may easily damage or destroy the film. Further, the carbon nanotube film has an extremely large specific surface area, and so is very sticky and difficult to handle, particularly when a large amount of carbon nanotube films are fabricated.

What is needed, therefore, is to provide a protective device for protecting carbon nanotube film.

BRIEF DESCRIPTION OF THE DRAWINGS

Many aspects of the embodiments can be better understood with reference to the following drawings. The components in the drawings are not necessarily to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
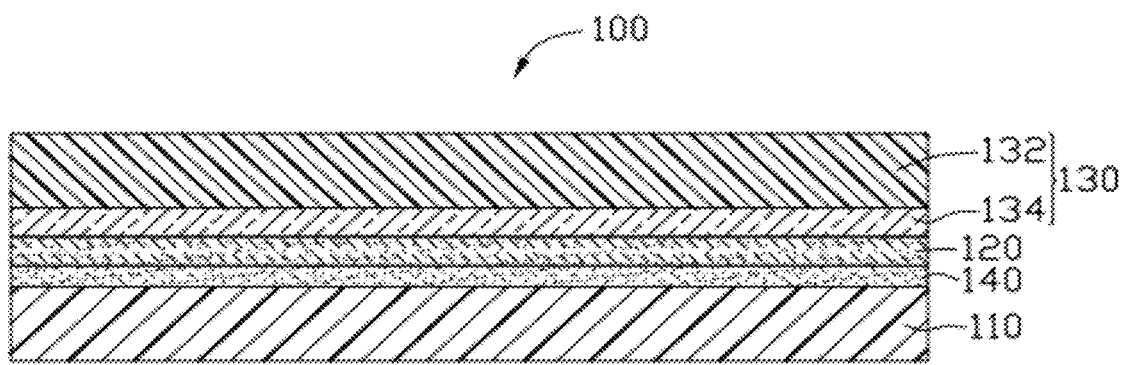
FIG. 1 is a schematic structural view of a first embodiment of a protective device for protecting a carbon nanotube film.

Referring to FIG. 1, according to a first embodiment, a protective device 100 for protecting at least one carbon nanotube film 120 includes a base film 110, and a protecting film 130. The at least one carbon nanotube film 120 is disposed on a surface of the base film 110. The protecting film 130 covers the at least one carbon nanotube film 120. More specifically, one or more carbon nanotube films 120 are disposed between the base film 110 and the protecting film 130. The base film 110 and the protecting film 130 sandwiches the one or more carbon nanotube films 120. When two or more carbon nanotube films 120 are interposed between the base film 110 and the protecting film 130, the two or more carbon nanotube films 120 can be stacked with each other and/or disposed in a coplanar manner.

The area of the base film 110 and the area of the protecting film 130 can be larger than the area of the carbon nanotube film 120, or at least equal to the area of the carbon nanotube film 120. The carbon nanotube film 120 includes two opposite surfaces, one of the two surfaces is contacted with and covered by the base film 110, and the other one of the two surfaces is contacted with and covered by the protecting film 130.

In one embodiment, the base film 110, the carbon nanotube film 120, and the protecting film 130 have a rectangular configuration, and the base film 110 and the protecting film 130 is wider than the carbon nanotube film 120.

Figure 2:
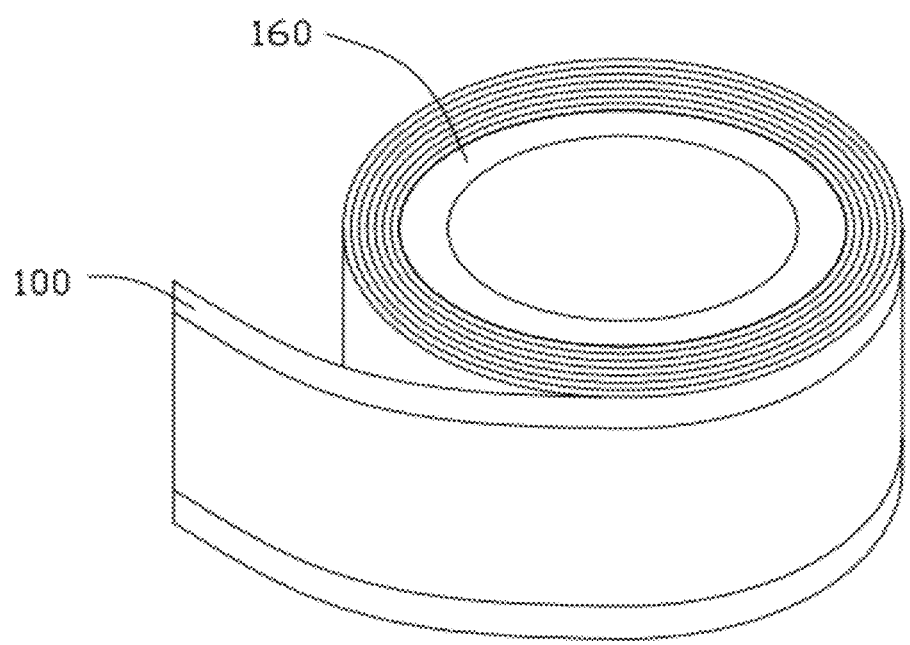
FIG. 2 is the protective device of FIG. 1 rolled up on a spool.

The thicknesses of the base film 110 and the protecting film 130 are both arbitrary but not so thick such that the base film 110 and the protecting film 130 lose flexibility. In one embodiment, the thicknesses of the base film 110 and the protecting film 130 are both 0.01 millimeters to 5 millimeters. The base film 110 and the protecting film 130 are made of a flexible material that can be bent, curved, and folded. Referring to FIG. 2, the structure having the carbon nanotube film 100 can be curved and rolled up on a first spool 160.

The carbon nanotube film 120 can be in direct contact with the base film 110. The adhesive nature of the carbon nanotube film 120 allows it to stably adhere to the base film 110.

The base film 110 is to support the carbon nanotube film 120. The material of the base film 110 can be paper, polymers (e.g., plastics or resins), or other elastic material. More specifically, the material of the base film 110 can be a polycarbonate (PC), polyethylene (PE), polypropylene (PP), polymethyl methacrylate (PMMA), polyethylene terephthalate (PET), polyether sulfone (PES), polyimide (PI), polyvinyl chloride (PVC), benzocyclobutene (BCB), cellulose ester, polyester, acrylic resin or any combination thereof. In one embodiment, the base film 110 is a PET film with relatively good transparency.

The protecting film 130 provides protection for the carbon nanotube film 120, and includes a protective back film 132 and a release layer 134 coated on the back film 132. The material of the protective back film 132 can be the same as the material of the base film 110. In other embodiments, the material of the protective back film 132 can be paper or other suitable material. The release layer 134 is in contact with the carbon nanotube film 120 and has a release effect against the carbon nanotube film 120 that enables the carbon nanotube film 120 to be released from the release layer 134. More specifically, the release layer 134 has a relatively low surface energy.

Further, the release layer 134 is combined with the carbon nanotube film 120 by van der Waals attractive force therebetween, and the van der Waals attractive force should be weaker than the attractive force between the carbon nanotube film 120 and the base film 110. Therefore, when releasing the protecting film 130 from the surface of the carbon nanotube film 120, the carbon nanotube film 120 will not be released from the base film 110. The release layer 134 can be made of silicon, cross-linkable silicone, paraffin, TEFLON, or any combination thereof. It is to be understood that the protecting film 130 can be a release liner of a pressure sensitive adhesive tape.

Figure 3:
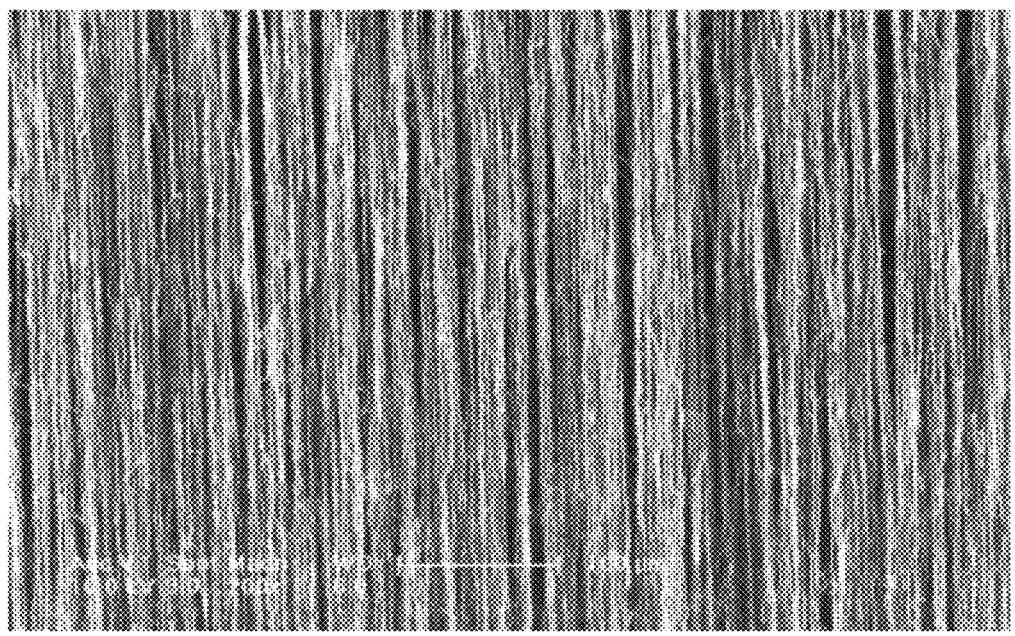
FIG. 3 shows a Scanning Electron Microscope (SEM) image of the protected carbon nanotube film of FIG. 1.

The carbon nanotube film 120 can be drawn from a carbon nanotube array by one embodiment of a method including steps of: providing a carbon nanotube array; selecting a plurality of carbon nanotube segments having a predetermined width from the carbon nanotube array by using a drawing tool (e.g., adhesive tape, pliers, tweezers, or another tool allowing multiple carbon nanotube segments to be gripped and pulled simultaneously); and pulling the carbon nanotube segments at an even/uniform speed to achieve a uniform carbon nanotube film 120. The carbon nanotube film 120 includes a plurality of carbon nanotubes uniformly distributed therein, and aligned substantially along a length direction of the carbon nanotube film 120. Referring to FIG. 3, the carbon nanotube film 120 includes a plurality of successive and oriented carbon nanotubes joined end-to-end by van der Waals attractive force therebetween and substantially parallel to a surface of the carbon nanotube film 120. More specifically, the carbon nanotube film 120 includes a plurality of successively oriented carbon nanotube segments joined end-to-end by van der Waals attractive force therebetween. Each carbon nanotube segment includes a plurality of carbon nanotubes substantially parallel to each other, and combined by van der Waals attractive force therebetween. As can be seen in FIG. 3, some variations can occur in the drawn carbon nanotube film 120. A thickness of the carbon nanotube film 120 can range from about 0.5 nanometers to about 100 micrometers. A width of the carbon nanotube film 120 is related to the drawing tool and the diameter/size of the carbon nanotube array. In one embodiment, the width of the carbon nanotube film 120 is about 10 centimeters to 100 centimeters. A length of the carbon nanotube film 120 is related to the size of the carbon nanotube array. In one embodiment, when the diameter of the carbon nanotube array is about 10 inches, the length of the carbon nanotube film 120 drawn from the carbon nanotube array can reach to about 100 meters. The carbon nanotubes in the carbon nanotube film 120 include single-walled carbon nanotubes, double-walled carbon nanotubes, or multi-walled carbon nanotubes. Diameters of the single-walled carbon nanotubes, the double-walled carbon nanotubes, and the multi-walled carbon nanotubes can, respectively, be in the approximate range from 0.5 to 50 nanometers, 1 to 50 nanometers, and 1.5 to 50 nanometers. The carbon nanotube film 120 is a free-standing film constructed by the plurality of carbon nanotubes joined end-to-end by van der Waals attractive force therebetween. The carbon nanotube film 120 is flexible and can be bent to various shapes. The single carbon nanotube film 120 can have a large specific surface area of above about 100 $m^2/g$ (BET testing method). Accordingly, the carbon nanotube film 120 is adhesive. When stacking two or more carbon nanotube films 120 together, adjacent carbon nanotube films 120 can be combined by van der Waals attractive force, and thus, a stable film-shape carbon nanotube structure can be formed. The stacked carbon nanotube films 120 can be interposed between the base film 110 and the protecting film 130. In other embodiments, two or more carbon nanotube films 120 can be interposed between the base film 110 and the protecting film 130 in a coplanar manner, thereby extending the width of the protective device 100.

For the reason that the carbon nanotubes in the carbon nanotube film 120 are substantially parallel to the surface of the carbon nanotube film 120, and a plurality of clearances is defined in the carbon nanotube film 120 by the carbon nanotubes, the carbon nanotube film 120 has good transparency. In one embodiment, the transmittance of the carbon nanotube film 120 for visible light is in a range of about 70% to about 99%.

For the reason that the carbon nanotubes in the carbon nanotube film 120 are substantially aligned along a single direction, in this direction (i.e., the length direction of the carbon nanotube film 120) the carbon nanotube film 120 has very high electrical and thermal conductivity.

In one embodiment, the protective device 100 further includes an adhesive layer 140 interposed between the carbon nanotube film 120 and the base film 110, thereby firmly fixing the carbon nanotube film 120 onto the surface of the base film 110. More specifically, the adhesive layer 140 and the carbon nanotube film 120 are combined by chemical bonds (e.g., hydrogen bonds). Therefore, a stronger attractive force can be formed between the carbon nanotube film 120 and the base film 110.

In one embodiment, the adhesive layer 140 can be made of a pressure sensitive adhesive. In one embodiment, butyl acrylate, 2-ethylhexyl acrylate, vinyl acetate, glycidyl methacrylate, acrylic acid, benzoyl peroxide, toluene and ethyl acetate are mixed and uniformly dispersed and coated on the base film 110, thereby forming the Page of adhesive layer 140. The adhesive layer 140 has a high cohesion and bonding strength.

In other embodiments, the adhesive layer 140 can be made of a hot melt adhesive such as methyl methacrylate ($CH_2C(CH_3)COOCH_3$). When being heated, the adhesive layer 140 melts and adheres the carbon nanotube film 120 onto the base film 110.

In other embodiments, the adhesive layer 140 can be made of a photosensitive adhesive, such as a solution of methyl methacrylate. The adhesive layer 140 is solidified by irradiation with ultraviolet rays, and used to adhere the carbon nanotube film 120 onto the base film 110.

It is to be understood that in other embodiments the protective device can include two protecting films. That is, the base film can be replaced by a protecting film. Each of the two protecting films includes a release layer. The carbon nanotube film is interposed between the two release layers of the two protecting films, thereby being protected.

The protective device 100 can be fabricated by one embodiment of a method including the following steps: providing at least one free-standing carbon nanotube film 120; laying the carbon nanotube film 120 between a base film 110 and a protecting film 130, or between two protecting films 130 to form a sandwiched structure, wherein the protecting film 130 has a release layer 134 facing the carbon nanotube film 120; and applying pressure on the sandwiched structure to combine the films.

Figure 4:
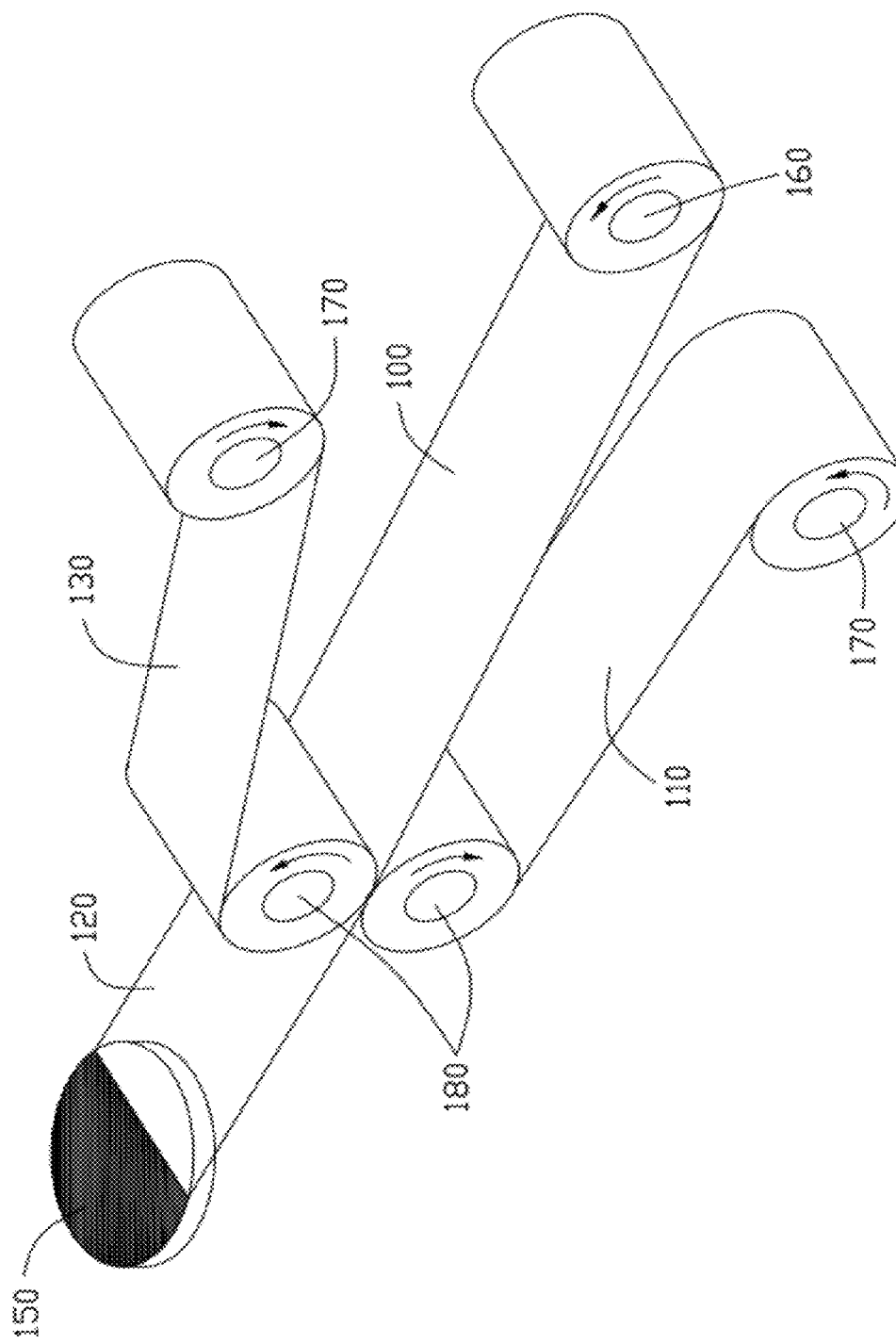
FIG. 4 is a schematic structural view of one embodiment of a method for making the protective device for protecting carbon nanotube film of FIG. 1.

The formation of the protective device 100 for protecting at least one carbon nanotube film can be accomplished by the drawing of the carbon nanotube film 120 from a carbon nanotube array. More specifically, referring to FIG. 4, a method for making the protective device 100 in the first embodiment, includes steps of:

(a) providing a base film 110, a protecting film 130, a first spool 160, and two rollers 180 contacting with each other;

(b) pulling/drawing out a carbon nanotube film 120 from a carbon nanotube array 150 by using a pulling/drawing tool, wherein the carbon nanotube film 120 has a first end connected to the carbon nanotube array 150 and a second end opposite to the first end; and (c) rotating the two rollers 180 and the first spool 160 at the same speed, and passing the base film 110, the carbon nanotube film 120 from the first end, and the protecting film 130 between the two rollers 180, wherein the two rollers 180 press the base film 110, the carbon nanotube film 120, and the protecting film 130 together to form the protective device 100 and conveying the protective device 100 to be rolled onto the first spool 160.

In step (a), the two rollers 180 are arranged cooperatively to provide a pressing contact, capable of applying a pressure on the object passing therebetween. The two rollers 180 have two substantially parallel shafts, upon which the rollers 180 can rotate clockwise or counterclockwise. The first spool 160 can also be connected to a rotatably driving means (not shown) to rotate at a same rate as the two rollers 180. The two rollers 180 and the first spool 160 can be substantially cylindrical in shape. Each of the two rollers 180 can have a resilient surface. A rubber material can be coated on the resilient surface of each roller 180. In other embodiments, the two rollers 180 can have a rigid metal surface coating, and can be heated to an elevated temperature. The two rollers 180 can then hot press the base film 110, the carbon nanotube film 120, and the protecting film 130 passed therebetween. The two rollers 180 can both be longer than each of the widths of the base film 110, the protecting film 130, and the carbon nanotube film 130. In one embodiment, a roll of base film 110, which is wound on a second spool 170, and a roll of protecting film 130, which is wound on a third spool 190, are provided. The second and third spools 170, 190 have shafts substantially parallel to the two rollers 180 and the first spool 160. The protecting film 130 can include the release layer 134 coated on a surface of the protective back film 132.

In step (b), a given carbon nanotube array 150 can be formed by a chemical vapor deposition (CVD) method. The carbon nanotube array 150 is formed on a substrate, and includes a plurality of carbon nanotubes substantially perpendicular to the surface of the substrate. The carbon nanotubes together form an array on the surface of Page of the substrate. The carbon nanotube array 150 is essentially free of impurities such as carbonaceous or residual catalyst particles. The carbon nanotubes in the carbon nanotube array 150 are closely packed together by van der Waals attractive force. Accordingly, a free-standing carbon nanotube film 120 can be drawn from the carbon nanotube array 150. The length of the carbon nanotubes can be approximately 50 microns to approximately 5 millimeters. In one embodiment, the length of the carbon nanotubes can be approximately ranged from 100 microns to 900 microns. The method for growing the carbon nanotube array 150 is disclosed by patent application US20080248235 to Feng et al.

In step (b), the pulling/drawing tool can be adhesive tape, pliers, tweezers, or another tool allowing multiple carbon nanotubes to be gripped and pulled simultaneously, and the carbon nanotube film 120 can be pulled/drawn out from the carbon nanotube array 150 by (b1) selecting a carbon nanotube segment having a predetermined width from the carbon nanotube array 150, and (b2) pulling the carbon nanotube segment at an even/uniform speed to achieve a uniform carbon nanotube film 120.

In step (b1), the carbon nanotube array is capable of having a film drawn therefrom. The carbon nanotube segment having a predetermined width can be selected by using an adhesive tape such as the pulling/drawing tool to contact the carbon nanotube array. The carbon nanotube segment includes a plurality of carbon nanotubes substantially parallel to each other. In step (b2), the pulling direction is arbitrary (e.g., substantially perpendicular to the growing direction of the carbon nanotube array).

More specifically, during the pulling/drawing process, as the initial carbon nanotube segment is drawn out, other carbon nanotube segments are also drawn out end-to-end due to the van der Waals attractive force between ends of adjacent segments. In general, the initially selected carbon nanotubes are drawn out from the carbon nanotube array by the moving of the drawing tool. The following carbon nanotubes adjacent to the initially selected carbon nanotubes are then drawn out by van der Waals attractive force between the following carbon nanotubes and the initially selected carbon nanotubes thereby forming the carbon nanotube film 120 with carbon nanotubes joined end-to-end by van der Waals attractive force therebetween. This process of drawing ensures that a continuous, uniform free-standing carbon nanotube film 120 having a predetermined width can be formed. Referring to FIG. 3, the drawn carbon nanotube film 120 includes a plurality of carbon nanotubes joined end-to-end. The carbon nanotubes in the drawn carbon nanotube film 120 are all substantially parallel to the pulling/drawing direction of the carbon nanotube film 120, and the carbon nanotube film 120 produced in such manner can be selectively formed to have a predetermined width. The width of the carbon nanotube film 120 depends on a size of the carbon nanotube array. The length of the carbon nanotube film 120 can be arbitrarily set as desired and can be above 100 meters. When the carbon nanotube array 150 is grown on a 4-inch P-type silicon wafer, as in the present embodiment, the width of the carbon nanotube film 120 approximately ranges from 0.01 centimeters to 10 centimeters, and the thickness of the carbon nanotube film 100 approximately ranges from 0.5 nanometers to 100 microns.

It is to be noted that, during the pulling/drawing process, the carbon nanotubes in the carbon nanotube array 150 are continuously drawn out to form the carbon nanotube film 120, and therefore, the size of the carbon nanotube array are continuously decreased and the length of the carbon nanotube film 120 are continuously increased. After step (b), the carbon nanotube film 120 is still in the pulling/drawing process, and in the length direction, the second end of the carbon nanotube film 120 is clamped by the pulling/drawing tool, and the first end of the carbon nanotube film 120 is connected to the carbon nanotube array 150.

It is also to be noted that, in step (b), two or more carbon nanotube films 120 can be simultaneously pulled/drawn from two or more carbon nanotube arrays 150 separately, all of which are still in the pulling/drawing process and the second ends are connected to the carbon nanotube arrays 150 separately.

In step (c), the base film 110, the carbon nanotube film 120, and the protecting film 130 are passed between the two rollers 180 in a manner which the carbon nanotube film 120 is sandwiched by the base film 110 and the protecting film 130.

In step (c), one end of the base film 110 can be passed between the two rollers 180 and then connected to the first spool 160. The end of the base film 110 can be unrolled from the second spool 170 and passed between the two rollers 180, and then connected to the first spool 160. Accordingly, a portion of the base film 110 has passed between the two rollers 180 while another portion of the base film 110 has not passed between the two rollers 180, and at least a portion of the base film 110 is tangentially applied between the two rollers 180. Then, a portion of the carbon nanotube film 120 from the second end and a portion of the protecting film 130 from one end thereof can be stacked along the length direction of the base film 110 on the portion of the base film 110 that has not passed between the two rollers 180. Due to the rotation of the two rollers 180, the portion of the base film 110 with the portion of carbon nanotube film 120 and the portion of protecting film 130 thereon will be conveyed between the two rollers 180. The end of the protecting film 130 can be unrolled from the second spool 170 and applied onto the carbon nanotube film 120 along the length direction of the base film 110.

In step (c), the base film 110, the carbon nanotube film 120, and the protecting film 130 can also be stacked with each other tangentially to the two rollers 180.

In step (c), the length directions of the base film 110, the carbon nanotube film 120, and the protecting film 130 are substantially parallel to each other. The release layer 134 of the protecting film 130 is in contact with the carbon nanotube film 120.

The carbon nanotube film 120 has a large specific surface area and is adhesive. Thus, the carbon nanotube film 120 can directly adhere onto the surface of the base film 110. In other embodiments, the surface of the base film 110 can be covered by an adhesive layer 140, and the carbon nanotube film 120 is laid on the adhesive layer 140 and adhered onto the base film 110 by the adhesive layer 140.

The axis of the two rollers 180 can be substantially parallel to the top surface of the carbon nanotube array 150, and thus, the carbon nanotube film 120 drawn from the carbon nanotube array 150 can be continuously passed between the two rollers 180 and rolled onto the first spool 160.

It is to be understood that, when two or more carbon nanotube films 120 are drawn from the two or more carbon nanotube arrays 150, the top surfaces of the carbon nanotube arrays 150 can be substantially parallel to each other and substantially parallel to the two rollers 180. The two or more carbon nanotube films 120 can be stacked with each other or be substantially coplanar on the base film 110 along the second ends of the two or more carbon nanotube films 120, and then passed between the two rollers 180.

In step (c), by the rotation of the first spool 160, the base film 110 is passed between the two rollers 180 and wound onto the first spool 160. The motion of the base film 110 pulls the carbon nanotube film 120 and the protecting film 130, and thus, passes the carbon nanotube film 120 and the protecting film 130 between the two rollers 180 together with the base film 110. The two rollers 180 apply pressure on the base film 110, the carbon nanotube film 120, and the protecting film 130, thereby forming a protective device 100. By the rotation of the first spool 160, the protective device 100 is rolled onto the first spool 160. The two rollers 180 convey the base film 110, the carbon nanotube film 120, and the protecting film 130 towards the first spool 160. The rotation of the two rollers 180 and the first spool 160 pulling/drawing the carbon nanotube film 120 continuously from the carbon nanotube array 150, cooperate to unroll the base film 110 and the protecting film 130 continuously from the second spools 170. The second spools 170 can be allowed to passively rotate.

The two rollers 180 can be heated to an elevated temperature, thereby combining the carbon nanotube film 120 firmly with the base film 110. When the adhesive layer 140 is coated on the base film 110, the adhesive layer 140 can melt when passing between the two rollers 180.

Figure 5:
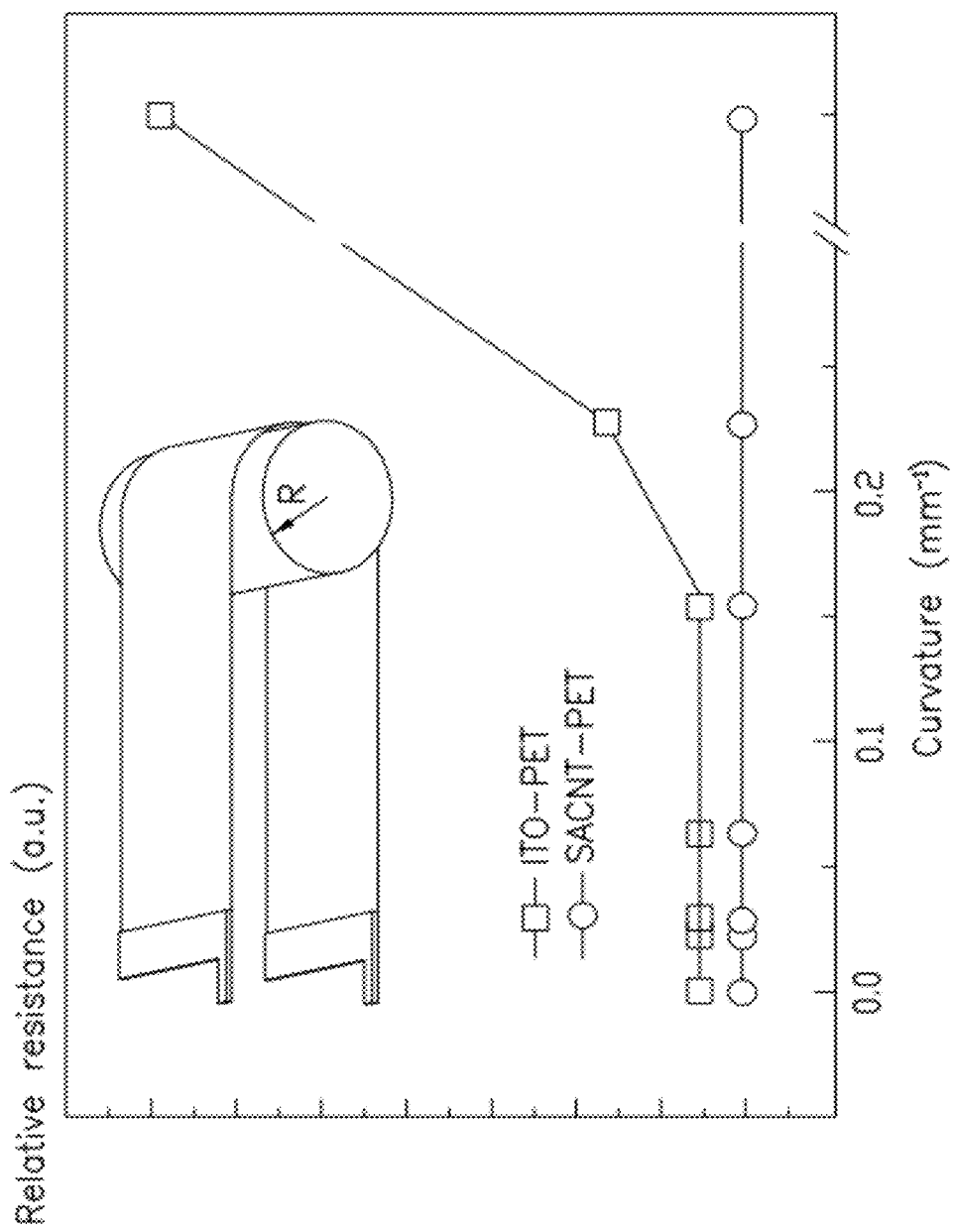
FIG. 5 is a curvature-resistance diagram of the protective device for protecting the carbon nanotube film of FIG. 1 and a similar structure having an indium tin oxide (ITO) film.

The method for making the protective device 100 can be continuously used in a mass production setup. The protective device 100 can be rolled onto the first spool 160 and thus is easy to preserve, store, transfer, and use. In use, the protecting film 130 can be easily separated from the carbon nanotube film 120. The protective device 100 can be cut to desired lengths and shapes, and widely used in many fields. For example, the base film 110 can be made of a material having good transparency, and the protective device 100 can be used as a flexible transparent conductive film. The protective device 100 is compared with a similar structure having an indium tin oxide (ITO) layer interposed between the same base film and the same protecting film as shown in FIG. 5. When the protective device 100 and the structure having the ITO layer are both curved at a radius R, and the curvature is defined as 1/R. As the curvature increases, the resistance of the protective device 100 does not change significantly, however the resistance of the structure having ITO layer increases dramatically.

Figure 6:
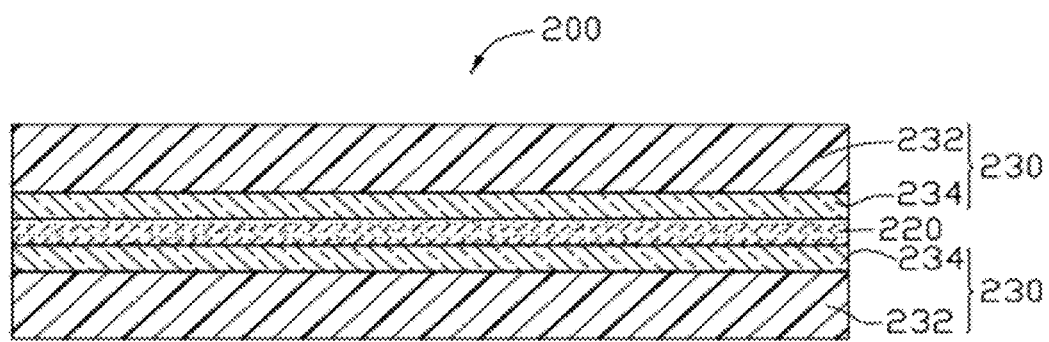
FIG. 6 is a schematic structural view of a second embodiment of a protective device for protecting carbon nanotube film.

Referring to FIG. 6, a protective device 200 according to a second embodiment includes at least one carbon nanotube film 220 and two protecting films 230. The at least one carbon nanotube film 220 is disposed on a surface of one protecting film 230. The other protecting film 230 covers the at least one carbon nanotube film 220. The protecting film 230 includes a protective back film 232 and a release layer 234 coated on a surface of the back film 232. The release layer 234 is in contact with the carbon nanotube film 220.

The protective device 200 of the second embodiment is similar to the protective device 100 of the first embodiment. One or more carbon nanotube films 220 are interposed between two protecting films 230. The two protecting films 230 sandwich the carbon nanotube film 220. When two or more carbon nanotube films 220 are interposed between the two protecting films 230, the two or more carbon nanotube films 220 can be stacked with each other. The release layers 234 of the two protecting films 230 sandwich the at least one carbon nanotube film 220. The protective device 200 of the second embodiment is similar to a double-side adhesive tape.

In use, one of the two protecting films 230 can be released from the surface of the carbon nanotube film 220. The exposed surface of the carbon nanotube film 220 can be attached on a surface of a device. Then, the other protecting film 230 can be released. The method for making the protective device 200 is similar to the method for making the protective device 100, wherein the base film 110 is replaced by a protecting film 230 having a release layer 234.

Figure 7:
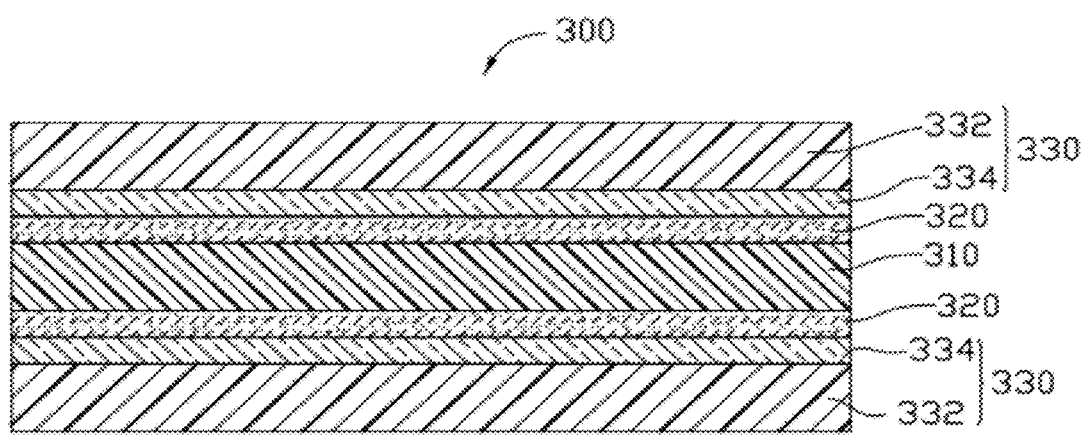
FIG. 7 is a schematic structural view of a third embodiment of a protective device for protecting carbon nanotube film.

Referring to FIG. 7, a protective device 300 according to a third embodiment includes a base film 310, at least two carbon nanotube films 320, and two protecting films 330. The at least two carbon nanotube films 320 are respectively disposed on the two opposite surfaces of the base film 310, thereby sandwiching the base film 310. The two protecting films 330 respectively cover the two carbon nanotube films 320, thereby sandwiching the two carbon nanotube films 320 and the base film 310. The protecting film 330 can include a protective back film 332 and a release layer 334 coated on the back film 332. The release layer 334 is in contact with the carbon nanotube film 320.

The protective device 300 of the third embodiment is similar to the protective device 100 of the first embodiment. The two opposite surfaces of the base film 310 are both covered by at least one carbon nanotube film 320. The method for making the protective device 300 is similar to the method for making the protective device 100, wherein at least one carbon nanotube film 320 and a protecting film 330 are further formed on the other surface of the base film 310. More specifically, two carbon nanotube arrays can be provided, and two carbon nanotube films 320 can be simultaneously drawn from the two carbon nanotube arrays. The two carbon nanotube films 320 can sandwich the base film 310, and the two protecting films 330 can sandwich the two carbon nanotube films 320 and the base film 310 at the same time when the five films pass between the two rollers.

Figure 8:
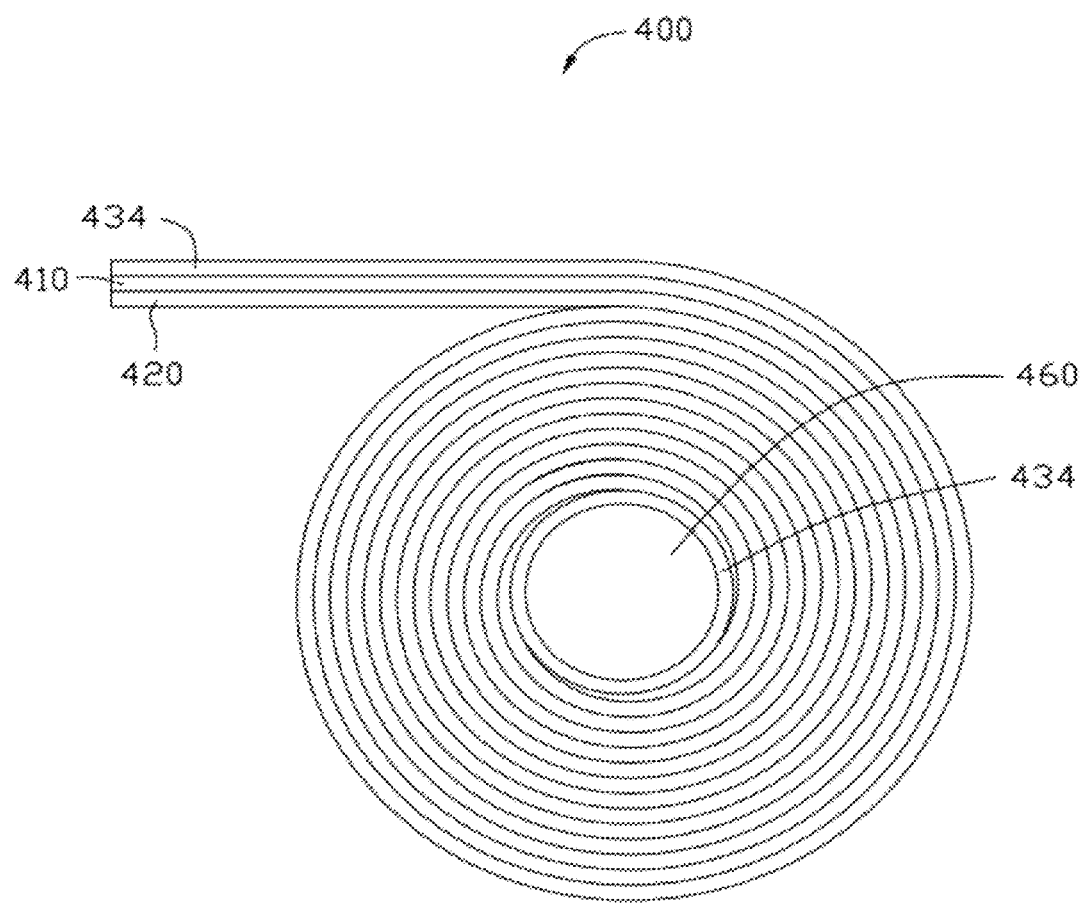
FIG. 8 is a schematic structural view of a fourth embodiment of a protective device for protecting carbon nanotube film.

Referring to FIG. 8, a protective device 400 according to a fourth embodiment includes a base film 410, at least one carbon nanotube film 420, and a protecting film. The at least one carbon nanotube film 420 is disposed on a surface of the base film 310. The protecting film includes a release layer 434. The release layer 434 is disposed on the other surface of the base film 310 that is away from the carbon nanotube film 420. The protective device 400 is rolled up on a spool 460. The surface of the spool 460 can be covered by a release layer 434.

The protective device 400 of the fourth embodiment is similar to the Page of protective device 100 of the first embodiment. The two opposite surfaces of the base film 410 are respectively covered by a carbon nanotube film 420 and a release layer 434. When the protective device 400 is rolled up on the spool 460, the carbon nanotube film 420 is sandwiched by the release layer 434 and the base film 410. The two opposite surfaces of the carbon nanotube film 420 are respectively in contact with the release layer 434 and the base film 410. Therefore, the carbon nanotube film 420 can be easily unrolled from the spool 460. The carbon nanotube film 420 is located on the surface of the base film 410 that is closer to the spool 460. The method for making the fourth embodiment of the protective device 400 is similar to the first embodiment of the protective device 100. More specifically, the carbon nanotube film 420 and the base film 410 can be pressed together, and further rolled onto the spool 460. The base film 410 is coated with the release layer 434 on the surface that is opposite to the surface of the base film 410 covered by the carbon nanotube film 420. By pressing the base film 410 and the carbon nanotube film 420 together, the base film 410 and the carbon nanotube film 420 can pass between the two rollers which can also have a release layer coated thereon. In another embodiment, the carbon nanotube film 420 can be disposed on the surface of the base film 410, and then, the carbon nanotube film 420 and the base film 410 can be rolled onto a spool and pressed together at the same time.

It is to be understood that the above description and the claims drawn to a Page of method may include some indication in reference to certain steps. However, the indication used is only to be viewed for identification purposes and not as a suggestion as to an order for the steps.

Finally, it is to be understood that the above-described embodiments are intended to illustrate rather than limit the disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. A method for making a protected carbon nanotube film, the method comprising:
   providing a base film, a protecting film comprising a release layer, a first spool, and two rollers in contact with each other;
   drawing out at least one carbon nanotube film from at least one carbon nanotube array;
   stacking a portion of the at least one carbon nanotube film and a portion of the protecting film on a portion of the base film along a length direction of the base film; and
   rotating the two rollers and the first spool to pull or draw out the at least one carbon nanotube film from at least one carbon nanotube array, so that the base film, the at least one carbon nanotube film, and the protecting film pass through the two rollers while being pressed by the two rollers and rolled onto the first spool; and the at least one carbon nanotube film is sandwiched between the base film and the protecting film, and directly contacted by the release layer, and the at least one carbon nanotube film consisting of carbon nanotubes,
   wherein the two rollers are heated and hot press the base film, the at least one carbon nanotube film, and the protecting film passing therebetween.

2. The method of claim 1, wherein the two rollers and the first spool are rotated at a same rate.

3. The method of claim 1, wherein two or more carbon nanotube films are drawn from two or more carbon nanotube arrays and stacked with each other to pass between the two rollers.

4. The method of claim 1, wherein the at least one carbon nanotube film comprises a plurality of successive carbon nanotubes joined end-to-end by van der Waals attractive force therebetween, and aligned substantially along a length direction of the at least one carbon nanotube film.

5. The method of claim 1, wherein axes of the two rollers are substantially parallel to a top surface of the carbon nanotube array.

6. The method of claim 1, wherein the two rollers apply a pressure on the base film, the at least one carbon nanotube film, and the protecting film.

* * * * *